United States Patent
Paul et al.

[11] Patent Number: 5,257,757
[45] Date of Patent: Nov. 2, 1993

[54] ADVANCED HYPERSONIC NOSECAP

[75] Inventors: Donald B. Paul, Bellbrook; Christopher L. Clay, Dayton, both of Ohio

[73] Assignee: The United States of America as represented by the Secretary of the Air Force, Washington, D.C.

[21] Appl. No.: 901,617

[22] Filed: Jun. 11, 1992

[51] Int. Cl.⁵ .............................................. B64C 1/38
[52] U.S. Cl. .......................... 244/117 A; 244/158 A; 165/154
[58] Field of Search ............... 244/117 A, 158 A, 163; 165/907, 154

[56] References Cited

U.S. PATENT DOCUMENTS

| | | | |
|---|---|---|---|
| 3,180,111 | 4/1965 | Rannenberg et al. | 244/117 A |
| 3,255,698 | 6/1966 | Lindberg, Jr. | 244/158 A |
| 3,321,154 | 5/1967 | Downs | 244/117 A |
| 3,416,750 | 12/1968 | Young | 244/158 A |
| 3,908,936 | 9/1975 | Durran | 244/117 A |
| 3,929,305 | 12/1975 | Sabol | 244/117 A |
| 4,014,485 | 3/1977 | Kinnaird et al. | 244/117 A |
| 4,739,952 | 4/1988 | Giles | 244/117 A |
| 4,778,130 | 10/1988 | Kim | 244/53 R |
| 4,786,015 | 11/1988 | Niggemann | 244/117 A |
| 4,923,146 | 5/1990 | Anthony | 244/158 A |

FOREIGN PATENT DOCUMENTS 3017252 11/1981 Fed. Rep. of Germany ... 244/158 A

*Primary Examiner*—Michael S. Huppert
*Assistant Examiner*—Anne E. Bidwell
*Attorney, Agent, or Firm*—Fredric L. Sinder; Thomas L. Kundert

[57] ABSTRACT

A hybrid active cooling system for hypersonic vehicle nosecaps and leading edges integrates a forced convection cooling system with a transpiration cooling system. A pair of concentric shells, hemispherical for a nosecap and cylindrical for a leading edge, are separated by pin fins to form a first manifold for passage of a convection coolant. A second manifold for a transpirant coolant is located behind the first manifold. The pin fins comprise a nonporous structural outer shell surrounding a porous core. The porous cores are open to the inside of the second manifold and to the outside of the first manifold. The outside of the first manifold forms part of the outer surface of the nosecap or leading edge. Convection coolant is pumped through the first manifold to provide forced convection cooling. Transpirant coolant pumped into the second manifold travels through the porous cores of the pin fins to be injected into the atmosphere to provide transpiration cooling. The disclosed hybrid forced convection/transpiration cooling system works better than either system working alone.

7 Claims, 1 Drawing Sheet

ADVANCED HYPERSONIC NOSECAP

RIGHTS OF THE GOVERNMENT

The invention described herein may be manufactured and used by or for the Government of the United States for all governmental purposes without the payment of any royalty.

BACKGROUND OF THE INVENTION

The present invention relates generally to high temperature protection for aircraft structures, and more particularly to active cooling systems for hypersonic vehicle nose caps and leading edges.

Nosecaps and leading edges of hypersonic (also called hypervelocity) vehicles can experience uncooled temperatures surpassing 6000° F. These high temperatures require the use of either active or passive cooling systems to maintain an acceptable structural temperature. Two of the more common active cooling methods are transpiration and forced convection. Transpiration cooling systems inject coolant into the atmosphere through holes distributed over the outer skin of a hypersonic vehicle. Cooling results from the phase change from liquid to gas of the transpirant coolant and from film cooling, in which the resulting gas film deflects the hot boundary layer away from the outer skin of the hypersonic vehicle. Forced convection cooling systems pump coolant through passages below the outer skin of the hypersonic vehicle. Cooling results from the convection coolant absorbing heat from the outer skin of the hypersonic vehicle. The hot convection coolant is then pumped to a heat exchanger, where it gives up the heat it absorbed from the outer skin, and then returns to the passages below the outer skin to absorb more heat.

Each of these two methods requires different tradeoffs among weight, reliability and safety. Transpiration cooling systems, because of their use of expendable coolants, are typically much heavier than forced convection cooling systems. Nevertheless, they generally are more efficient, providing the most cooling for the least weight of coolant. For identical reentry conditions, the coolant requirements for transpiration cooling systems will be much less than that for forced convection cooling systems. Moreover, the safety and reliability of transpiration cooling systems have been demonstrated by their successful use for high temperature protection in the past.

Forced convection methods, although never used in a hypersonic environment, have an advantage of their own in that they can use the liquid hydrogen or other hypersonic vehicle fuel as their coolant, so that the weight of the coolant as a design parameter is largely removed. Transpiration cooling systems have a similar advantage in that, for reentry, they can use as the transpiration coolant water created in orbit as a byproduct of power generation.

It is seen, therefore, that while transpiration cooling systems are generally more efficient than forced convection cooling systems, each cooling system has separate unique advantages particularly relevant to a hypersonic vehicle.

It is, therefore, a principal object of the present invention to provide an improved apparatus and method for high temperature protection for hypersonic vehicle nosecaps and leading edges that integrates the best features of both transpiration and forced convection cooling systems with as few as possible of their disadvantages.

It is another object of the present invention to make a hypersonic vehicle cooling system that is both safer and significantly lighter than prior cooling systems.

It is a feature of the present invention that it provides redundancy in the event of a partial failure of the cooling system.

It is an advantage of the present invention that its hybrid design will be generally safer and significantly lighter than either a transpiration or forced convection system used alone.

It is another advantage of the present invention that it will be more reliable than either cooling system used alone.

It is a further advantage of the present invention that its operation can be optimized to reduce the required expendable onboard coolant, reduce thermal stresses, and allow vehicle operation at higher dynamic pressures than are now planned, significantly improving engine performance.

It is yet another advantage of the present invention that it will allow for more extreme temperatures during envelope expansion of a hypersonic vehicle than either cooling system used alone.

It is also an advantage of the present invention that it is straightforward and easy to implement.

These and other objects, features and advantages of the present invention will become apparent as the description of certain representative embodiments proceeds.

SUMMARY OF THE INVENTION

The present invention provides a combination forced convection and transpiration cooling system superior to either cooling system used alone. It has been discovered that a hybrid forced convection and transpiration cooling system can be made in which as many components as possible efficiently do double duty as part of both cooling systems. The present invention utilizes concentric hemispheres for a nosecap (or concentric cylinders for a leading edge), separated by pin fins, to form separate manifolds for convection coolant and for transpirant coolant. A unique discovery of the present invention is that the pin fins can be made with porous cores so that they both structurally separate the concentric hemispheres (or concentric cylinders) to provide a path for flowing coolant for forced convection cooling and can feed transpirant coolant to the outside of the outer hemisphere or cylinder for transpiration cooling.

Accordingly, the present invention is directed to a cooling apparatus for hypersonic vehicles, comprising an outer shell and an inner shell arranged in a spaced concentric arrangement, forming between them a first manifold; a back wall for the inner shell, forming between the back wall and the inner shell a second manifold; a supply of convection coolant connected to the first manifold; a supply of transpirant coolant connected to the second manifold; and, a plurality of pin fins structurally separating the outer and inner shells, wherein each pin fin comprises a nonporous shell surrounding a porous core, and wherein the porous core of each pin fin is open at one end through the inner shell to the second manifold and open at the other end through the outer shell to outside the outer shell. The porous cores of the pin fins may be made of a sintered metal.

The present invention is also directed to a cooling method for hypersonic vehicles, comprising the steps of providing an outer shell and an inner shell arranged in a spaced concentric arrangement, forming between them a first manifold, wherein the outer shell has an outside surface which is a part of the outside surface of a hypersonic vehicle; providing a back wall for the inner shell, forming between the back wall and the inner shell a second manifold; providing a plurality of pin fins separating the outer and inner shells, wherein each pin fin comprises a nonporous shell surrounding a porous core, and wherein the porous core of each pin fin is open at one end through the inner shell to the second manifold and open at the other end through the outer shell to outside the outer shell; pumping a convection coolant through the first manifold; and, pumping a transpirant coolant into the second manifold so that the transpirant coolant travels through the porous cores of the pin fins and escapes outside the outer shell. The method may also comprise the steps of pumping the convection coolant and the transpirant coolant beginning at different times, for different durations and at different rates to meet varying cooling requirements.

The present invention is more broadly directed to a cooling apparatus for hypersonic vehicles, comprising a first manifold having a first wall; a second manifold having a second wall; and, a plurality of pin fins inside the first manifold, wherein each pin fin comprises a nonporous shell surrounding a porous core, wherein each pin fin has one end extending both through the first wall and through the second wall where the porous core is open to the inside of the second manifold, and wherein each pin fin has its other end extending through the first wall to outside both the first and second manifolds. The cooling apparatus may further comprise a supply of convection coolant connected to the first manifold; and, a supply of transpirant coolant connected to the second manifold.

The present invention is also more broadly directed to a cooling method for hypersonic vehicles, comprising the steps of providing a first manifold having a first wall, wherein at least part of the first wall has an outside surface which is a part of the outside surface of a hypersonic vehicle; providing a second manifold having a second wall; providing a plurality of pin fins inside the first manifold, wherein each pin fin comprises a nonporous shell surrounding a porous core, wherein each pin fin has one end extending both through the first wall and through the second wall where the porous core is open to the inside of the second manifold, and wherein each pin fin has its other end extending through the first wall to outside both the first and second manifolds; pumping a convection coolant through the first manifold; and, pumping a transpirant coolant into the second manifold so that the transpirant coolant travels through the porous cores of the pin fins and escapes outside both the first and second manifolds.

DESCRIPTION OF THE DRAWINGS

The present invention will be more clearly understood from a reading of the following detailed description in conjunction with the accompanying drawings wherein.

DETAILED DESCRIPTION

Figure 1:
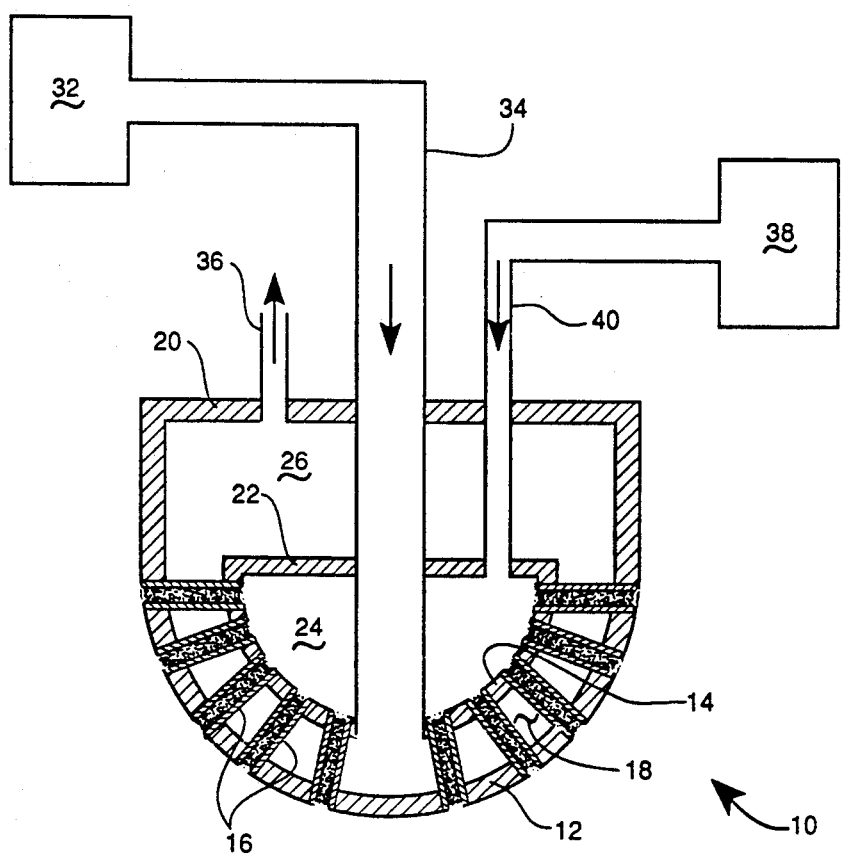
FIG. 1 is a cross-sectional representational view of a hypersonic vehicle nosecap according to the teachings of the present invention; and, FIG. 2 is a more detailed cross-sectional view of a pair of porous metal pin fins shown extending through a pair of nosecap or leading edge shells according to the teachings of the present invention.

Referring now to FIG. 1 of the drawings, there is shown a cross-sectional representational view of a hypersonic vehicle nosecap 10 according to the teachings of the present invention. Nosecap 10 includes an outer shell 12 and an inner shell 14 structurally separated by pin fins 16. Shells 12 and 14 will be generally hemispherical for use as part of a nosecap, and would be generally cylindrical when used as part of a leading edge. The space between outer shell 12 and inner shell 14 forms a first manifold 18. Outer shell 12 has a first back wall 20. A second back wall 22 for inner shell 14 forms a second manifold 24. A third manifold 26, which is an extension of first manifold 18, is formed in the space between first back wall 20 and second back wall 22.

Figure 2:
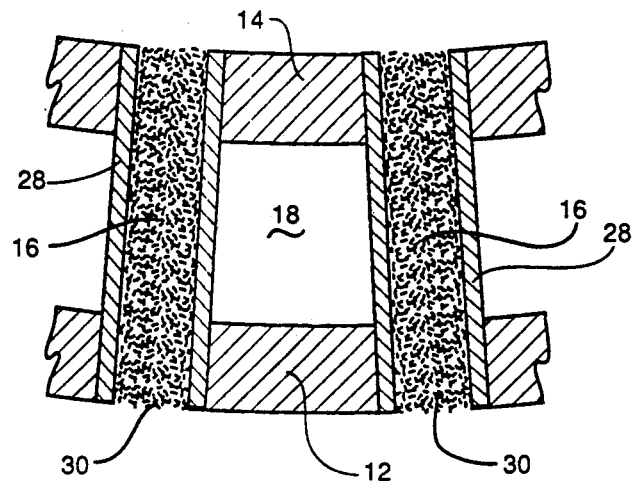

As shown in FIG. 2, each pin fin 16 comprises a nonporous structural outer shell 28 and a porous core 30. Each pin fin 16 extends through inner and outer shells 12 and 14 so that each porous core 30 is open at one end through inner shell 14 to the second manifold and open at its other end through outer shell 12 to outside outer shell 12.

A supply 32 of convection coolant is connected to first manifold 18 by conduit 34. Convection coolant pumped into first manifold 18 through conduit 34 travels through first manifold 18, into third manifold 26 and exits through conduit 36 to a heat exchanger (not shown) before it returns to convection coolant supply 32. If fuel, typically liquid hydrogen for a hypersonic vehicle, is used as the convection coolant, the convection coolant exits through conduit 36 directly to the vehicle engine. The forced convection coolant can be liquid hydrogen, if fuel, or otherwise helium, nitrogen or water.

A supply 38 of transpirant coolant is connected to second manifold 24 by conduit 40. Transpirant coolant pumped into second manifold 24 through conduit 40 travels through the porous core 30 of each pin fin 16 to outside outer shell 12 where it is injected into the atmosphere.

In use on a hypersonic vehicle, the described hybrid transpiration/forced convection cooling system is more efficient than either cooling system used alone. The cooling from the forced convection cooling system, using fuel as the forced convection coolant, reduces the amount of transpiration coolant needed to be expended for a given degree of cooling and, at lower speeds, may even eliminate it. The transpiration and forced convection cooling modes of the apparatus may be used separately or together. Because the fuel in a hypersonic vehicle is available anyway for use as a convection coolant, to reduce the amount of transpiration coolant needed to be carried, the transpiration cooling mode of the described convection cooling system can be used only to augment the forced convection cooling mode. Used jointly, the transpiration mode reduces heat flux to a nosecap or leading edge and the forced convection mode will remove the remaining heat. During ascent, a transpiration system working alone requires a tremendous amount of transpirant coolant. A forced convection system, if using the hypersonic vehicle fuel, requires no additional coolant or, if a secondary coolant loop is used, only a very little additional coolant during ascent. It is anticipated that during ascent, an optimized dual use mode will add transpiration cooling so that the overall weight of expendable coolant is as low as possible while providing sufficient cooling. Optimizing the dual system performance will allow a hypersonic vehicle to fly at much higher dynamic pressures than is currently achievable, significantly improving engine performance. During descent, the transpiration mode of operation should be sufficient for most missions. As discussed earlier, liquid produced as a byproduct of power generation in orbit, or by other methods, may be used as the transpirant coolant during descent.

The hybrid cooling system may be fabricated using a variety of well-known fabrication methods. Preferred techniques would include chemical milling or brazing pin fins 16 to shells 12 and 14. The porous cores 30 of pin fins 16 can be made of any porous material, but preferably would be made of a sintered metal. Any metal that can be produced in a powdered form can be sintered, such as aluminum and even superalloys. Pin fin outer shells 28 can be made of any nonporous material sufficiently strong to structurally separate shells 12 and 14.

Those with skill in the art will see that pin fins 16 may be made in a variety of different shapes, such as aerodynamic in the direction of the forced convection coolant flow, and still perform their primary functions of separating shells 12 and 14 to form first manifold 18 and supporting a porous core for delivery of transpirant to an outside surface. Other of the described components may similarly be modified to improve the overall performance of the system without interfering with their primary function.

The disclosed method and apparatus for cooling nosecaps and leading edges of hypersonic vehicles successfully demonstrate the use of an integrated hybrid transpiration and forced convection cooling system. Although the disclosed system is specialized, its teachings will find application in other areas active cooling can be used and a transpirant can be injected into the environment. For example, for shock on lip engine cowl heating, a transpirant can be injected into the flow field to block shock heating during the short period the shock is incident on the cowl leading edge.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

We claim:

1. A cooling apparatus for hypersonic vehicles, comprising:
    (a) an outer shell and an inner shell arranged in a spaced concentric arrangement, forming between them a first manifold;
    (b) a back wall for the inner shell, forming between the back wall and the inner shell a second manifold;
    (c) a supply of convection coolant connected to the first manifold;
    (d) a supply of transpirant coolant connected to the second manifold; and,
    (e) a plurality of pin fins structurally separating the outer and inner shells, wherein each pin fin comprises a nonporous shell surrounding a porous core, and wherein the porous core of each pin fin is open at one end through the inner shell to the second manifold and open at the other end through the outer shell to outside the outer shell.

2. The cooling apparatus according to claim 1, wherein the porous cores of the pin fins are made of a sintered metal.

3. A cooling method for hypersonic vehicles, comprising the steps of:
    (a) providing an outer shell and an inner shell arranged in a spaced concentric arrangement, forming between them a first manifold, wherein the outer shell has an outside surface which is a part of the outside surface of a hypersonic vehicle;
    (b) providing a back wall for the inner shell, forming between the back wall and the inner shell a second manifold;
    (c) providing a plurality of pin fins separating the outer and inner shells, wherein each pin fin comprises a nonporous shell surrounding a porous core, and wherein the porous core of each pin fin is open at one end through the inner shell to the second manifold and open at the other end through the outer shell to outside the outer shell;
    (d) pumping a convection coolant through the first manifold; and,
    (e) pumping a transpirant coolant into the second manifold so that the transpirant coolant travels through the porous cores of the pin fins and escapes outside the outer shell.

4. The cooling method according to claim 3, further comprising the steps of pumping the convection coolant and the transpirant coolant beginning at different times, for different durations and at different rates to meet varying cooling requirements.

5. A cooling apparatus for hypersonic vehicles, comprising:
    (a) a first manifold having a first wall;
    (b) a second manifold having a second wall; and,
    (c) a plurality of pin fins inside the first manifold, wherein each pin fin comprises a nonporous shell surrounding a core of porous material, wherein each pin fin has one end extending both through the first wall and through the second wall where the core of porous material is open to the inside of the second manifold, and wherein each pin fin has its other end extending through the first wall to outside the first and second manifolds.

6. A cooling apparatus for hypersonic vehicles, comprising:
    (a) a first manifold having a first wall;
    (b) a second manifold having a second wall;
    (c) a plurality of pin fins inside the first manifold, wherein each pin fin comprises a nonporous shell surrounding a porous core, wherein each pin fin has one end extending both through the first wall and through the second wall where the porous core is open to the inside of the second manifold, and wherein each pin fin has its other end extending through the first wall to outside the first and second manifolds;
    (d) a supply of convection coolant connected to the first manifold; and,
    (e) a supply of transpirant coolant connected to the second manifold.

7. A cooling method for hypersonic vehicles, comprising the steps of:
    (a) providing a first manifold having a first wall, wherein at least part of the first wall has an outside surface which is a part of the outside surface of a hypersonic vehicle;

(b) providing a second manifold having a second wall;
(c) providing a plurality of pin fins inside the first manifold, wherein each pin fin comprises a nonporous shell surrounding a porous core, wherein each pin fin has one end extending both through the first wall and through the second wall where the porous core is open to the inside of the second manifold, and wherein each pin fin has its other end extending through the first wall to outside both the first and second manifolds;
(d) pumping a convection coolant through the first manifold; and,
(e) pumping a transpirant coolant into the second manifold so that the transpirant coolant travels through the porous cores of the pin fins and escapes outside both the first and second manifolds.

* * * * *